United States Patent
Yokota

(10) Patent No.: US 8,407,991 B2
(45) Date of Patent: Apr. 2, 2013

(54) CONSTRUCTION MACHINE

(75) Inventor: Jumpei Yokota, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 360 days.

(21) Appl. No.: 12/682,193

(22) PCT Filed: Aug. 29, 2008

(86) PCT No.: PCT/JP2008/065542
§ 371 (c)(1),
(2), (4) Date: Apr. 8, 2010

(87) PCT Pub. No.: WO2009/054184
PCT Pub. Date: Apr. 30, 2009

(65) Prior Publication Data
US 2010/0218488 A1    Sep. 2, 2010

(30) Foreign Application Priority Data

Oct. 22, 2007  (JP) .................................. 2007-274087

(51) Int. Cl.
*F01N 3/00* (2006.01)
(52) U.S. Cl. ........... 60/297; 60/295; 60/286; 180/89.13; 180/89.17; 180/326; 180/327
(58) Field of Classification Search .................... 60/295, 60/286, 297; 180/89.13, 89.17, 326, 327
See application file for complete search history.

(56) References Cited

U.S. PATENT DOCUMENTS

2009/0101375 A1 *  4/2009  Tsukui et al. ................. 172/776

FOREIGN PATENT DOCUMENTS

| JP | 2002 317631 | 10/2002 |
|----|----|----|
| JP | 2003 41627 | 2/2003 |
| JP | 2003 90214 | 3/2003 |
| JP | 2003 120277 | 4/2003 |
| JP | 2005-155404 | * 6/2005 |
| JP | 2005 155404 | 6/2005 |
| JP | 2006 328883 | 12/2006 |
| JP | 2007 100351 | 4/2007 |
| WO | WO 2007077661 A1 | * 7/2007 |

OTHER PUBLICATIONS

U.S. Appl. No. 12/679,815, filed Mar. 24, 2010, Yokota.

* cited by examiner

*Primary Examiner* — Thomas Denion
*Assistant Examiner* — Matthew T Largi
(74) *Attorney, Agent, or Firm* — Oblon, Spivak, McClelland, Maier & Neustadt, L.L.P.

(57) ABSTRACT

A construction machine that permits an exhaust gas aftertreatment device to be disposed while avoiding an increase of height and hence avoiding narrowing of an operator's visual field. A guard panel is disposed substantially in parallel with a base frame. The guard panel includes a top plate, the top plate including an opening formed at a portion thereof corresponding to an engine, and a bonnet formed so as to project upwards from the top plate and cover the opening. A first treatment section is disposed lower than the top plate and a second treatment section includes at least a portion positioned higher than the top plate through the opening and lower than the bonnet.

9 Claims, 10 Drawing Sheets

CONSTRUCTION MACHINE

TECHNICAL FIELD

The present invention relates to a construction machine provided with an exhaust gas after-treatment device for purifying exhaust gas from an engine.

BACKGROUND

Heretofore, there has been known a construction machine provided with a base frame which supports a working attachment so as to be raised and lowered, an engine installed on the base frame, and a guard panel for covering over the base frame.

In construction machines of this type it has recently been desired that an exhaust gas after-treatment device for purifying exhaust gas from an engine be installed on a base frame.

More particularly, the aforesaid exhaust gas after-treatment device has a DPF (Diesel Particulate Filter) for decreasing the amount of dust such as soot and mist contained in the engine exhaust gas and also has a reduction catalyst for decreasing the amount of NOx contained in the exhaust gas (see, for example, Patent Documents 1 and 2).

However, since the engine and related peripheral devices (e.g., hydraulic systems) are disposed in a planarly massed layout on the base frame, it is difficult to newly ensure on the base frame a space as a planar space for disposing the exhaust gas after-treatment device.

One countermeasure is to ensure a new space over the base frame. However, with a mere installation of the exhaust gas after-treatment device over the engine and a peripheral device thereof, not only the construction machine itself becomes larger in height, but also there results the problem that the visual field from the operator becomes narrow.

[Patent Document 1] Japanese Patent Laid-Open Publication No. 2003-90214

[Patent Document 2] Japanese Patent Laid-Open Publication No. 2003-120277

DISCLOSURE OF THE INVENTION

The present invention has been accomplished in view of the above-mentioned problem and it is an object of the invention to provide a construction machine which permits an exhaust gas after-treatment device to be disposed while avoiding an increase of height and hence avoiding narrowing of the operator's visual field.

In order to avoid the foregoing problem, the present invention provides a construction machine having a working attachment, the construction machine including: a base frame for supporting the working attachment so as to be raised and lowered; an engine installed on the base frame; an exhaust gas after-treatment device able to purify exhaust gas from the engine while the exhaust gas flows therethrough; and a guard panel installed over the base frame so as to cover the engine and the exhaust gas after-treatment device, wherein the exhaust gas after-treatment device includes a first treatment section having a filter able to collect dust contained in the exhaust gas from the engine and a second treatment section having a catalyst for decomposing nitrogen oxides contained in the exhaust gas treated by the first treatment section, the guard panel includes a top plate, the top plate being disposed substantially in parallel with the base frame and having an opening in a portion thereof corresponding to the engine, and a bonnet formed so as to project upwards from the top plate and cover the opening, one of the first and second treatment sections is disposed lower than the top plate, and at least a part of the other treatment section is disposed higher than the top plate through the opening and lower than the bonnet.

According to the present invention, an exhaust gas after-treatment device can be disposed while suppressing an increase of height and hence suppressing narrowing of the operator's visual field.

BEST MODE FOR CARRYING OUT THE INVENTION

Preferred embodiments of the present invention will be described below with reference to the drawings.

Figure 1:
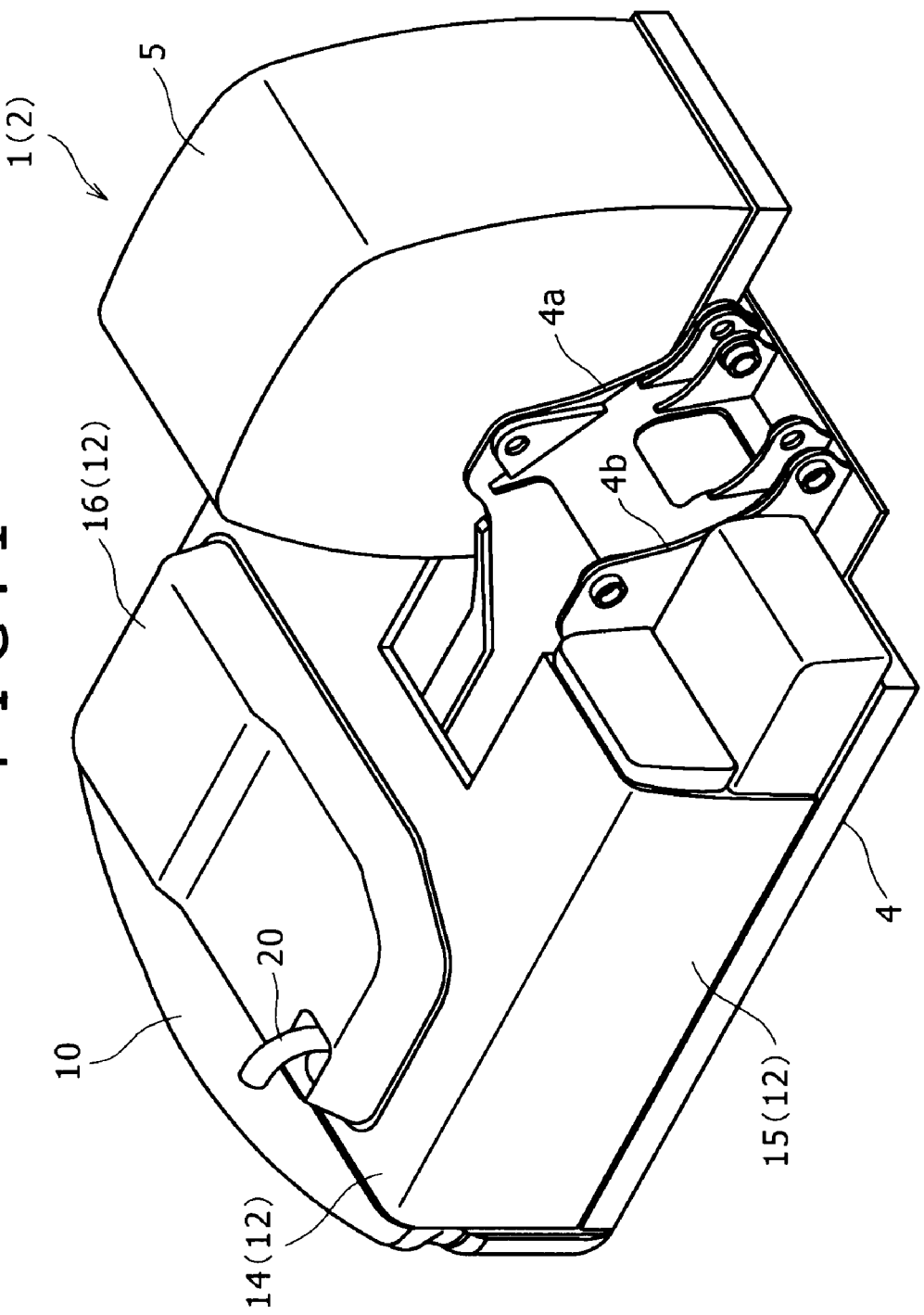
FIG. 1 is a perspective view showing an upper rotating body of a hydraulic excavator according to an embodiment of the present invention.
Figure 2:
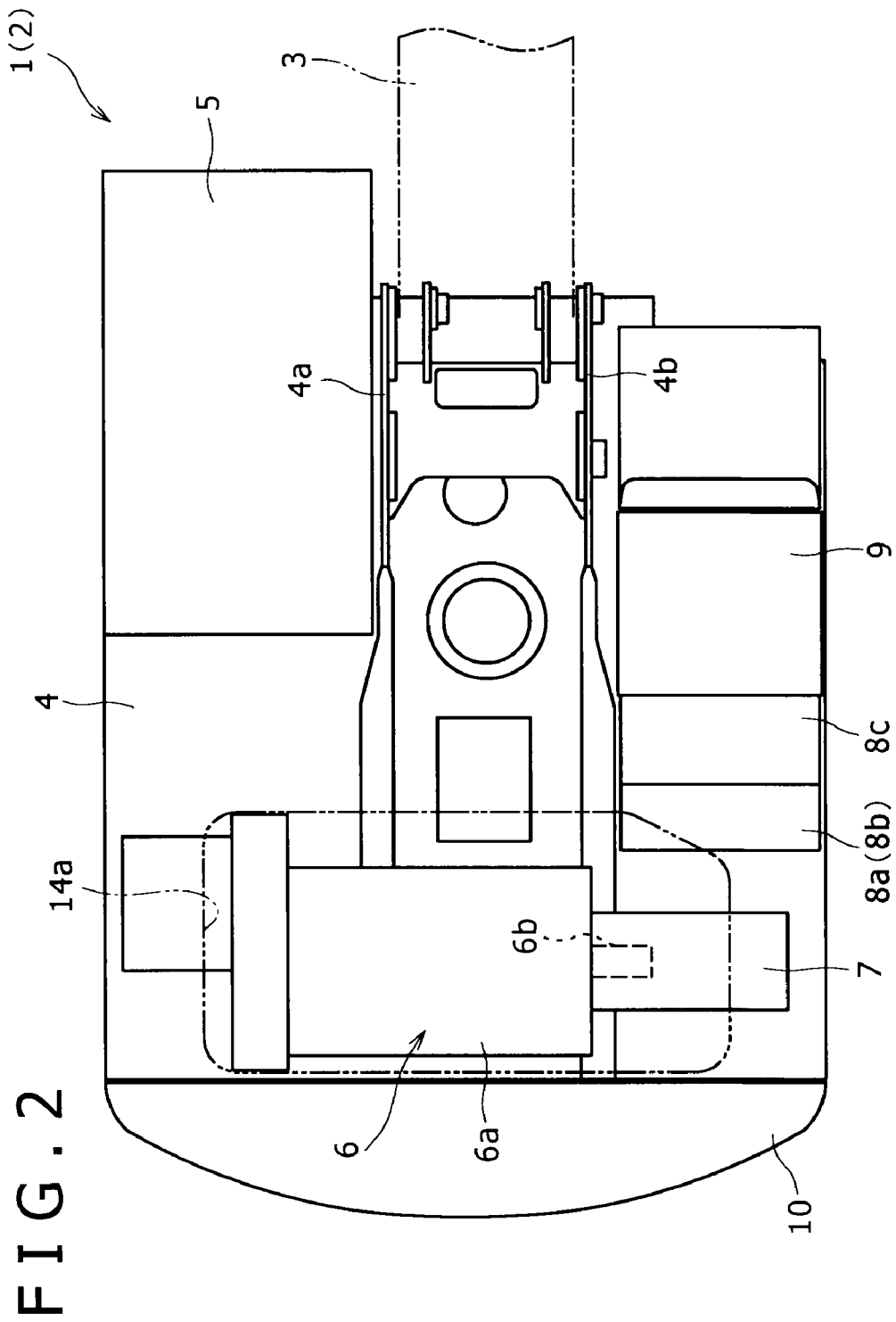
FIG. 2 is a plan view of the upper rotating body in FIG. 1 with both a guard panel and exhaust gas after-treatment device omitted.
Figure 3:
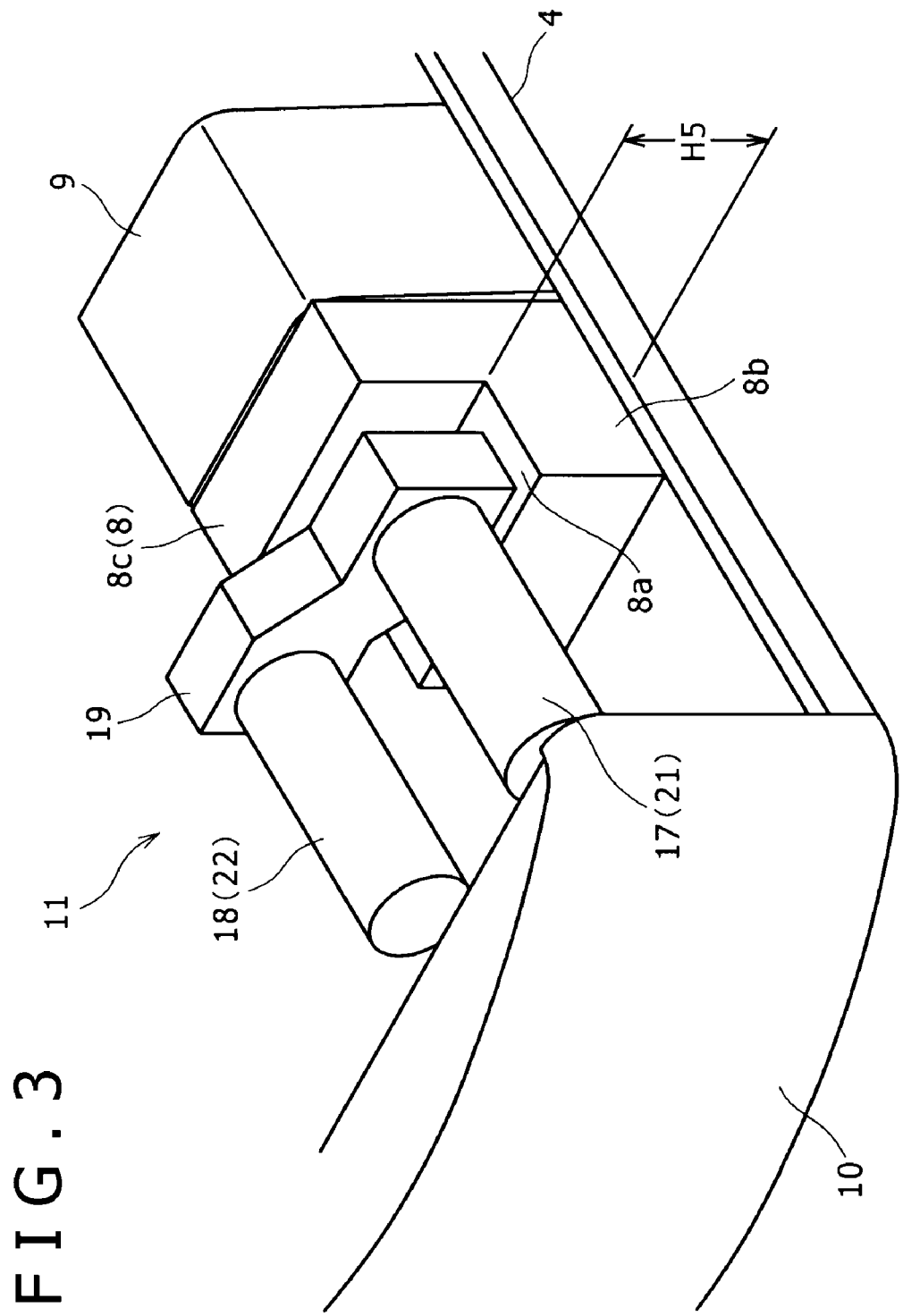
FIG. 3 is a perspective view showing a state in which an exhaust gas after-treatment device is disposed on the upper rotating body of FIG. 2.

FIG. 1 is a perspective view showing an upper rotating body of a hydraulic excavator according to an embodiment of the present invention. FIG. 2 is a plan view of the upper rotating body of FIG. 1 with both a guard panel and exhaust gas after-treatment device omitted. FIG. 3 is a perspective view showing a state in which an exhaust gas after-treatment device is disposed on the upper rotating body of FIG. 2.

Referring to FIGS. 1 to 3, a hydraulic excavator 1 is provided with a crawler type lower traveling body (not shown), an upper rotating body 2 mounted rotatably on the lower traveling body, and a working attachment 3 (see FIG. 2) supported so as to be raised and lowered with respect to the upper rotating body 2.

The upper rotating body 2 is provided with a base frame 4 installed on the lower traveling body, a guard panel 12 which covers over the base frame 4, as well as a cabin 5, an engine 6, a hydraulic pump 7, a working oil tank 8, a fuel tank 9, a counterweight 10, and an exhaust gas after-treatment device 11 (see FIG. 3), which are all installed on the base frame 4. In the following description it is assumed that the direction from front to rear and the direction from right to left as seen from an operator sitting on an operator's seat (not shown) within the cabin 5 are longitudinal and transverse directions, respectively, of the upper rotating body 2.

A pair of left and right vertical plates 4a and 4b extending in the longitudinal direction are erected on the base frame 4 at a nearly central position in the transverse direction. The working attachment 3 is supported between front portions of the vertical plates 4a and 4b. The cabin 5 is installed at a left front position of the left vertical plate 4a.

The engine 6 is installed on the vertical plates 4a and 4b at a rear portion of the base frame 4 so that its longitudinal direction faces in the transverse direction. The engine 6 includes an engine body 6a and an output shaft 6b projecting rightwards from a right end face of the engine body 6a. A right end portion of the engine body 6a is disposed substantially above the right vertical plate 4b.

The hydraulic pump 7 is connected transversely to the output shaft 6b through a coupling (not shown) or the like so as to become capable of being operated with the power of the engine 6. As a result, the hydraulic pump 7 is disposed in an area from above the right vertical plate 4b to the right side of the same plate (see FIG. 2).

In this embodiment, the working oil tank 8 and the fuel tank 9 are disposed longitudinally in a line at the right-hand position of the right vertical plate 4b. That is, the fuel tank 9 is disposed in the front and the working oil tank 8 is disposed in the rear. As a result, the working oil tank 8 is disposed adjacently to and in front of the hydraulic pump 7.

The working oil tank 8 includes, as integral components, a large height portion 8c having a height almost equal to the height of the counterweight 10, and a small height portion 8b formed behind the large height portion 8c and having an upper surface 8a, the upper surface 8a having a height H5 almost equal to or lower than the height H4 (see FIG. 4) of the hydraulic pump 7.

The counterweight 10 is provided along a rear edge portion of the base frame 4. That is, the counterweight 10 confronts the working oil tank 8 longitudinally with the hydraulic pump 7 therebetween. The exhaust gas after-treatment device 11, which is for purifying exhaust gas from the engine 6, is installed between the counterweight 10 and the working oil tank 8 and over the hydraulic pump 7. As to the structure of the exhaust gas after-treatment device 11, it will be described later.

The guard panel 12 is installed over the base panel 4 so as to cover the engine 6, hydraulic pump 7, working oil tank 8, fuel tank 9 and exhaust gas after-treatment device 11. More specifically, the guard panel 12 includes a top plate 14 disposed substantially in parallel with the base frame 4, a pair of side plates 15 provided at right and left edge portions of the top plate 14 (only the right one is shown in FIG. 1), and a bonnet 16 provided so as to project upwards from the top plate 14.

The top plate 14 is installed longitudinally within from the counterweight 10 to the cabin 5 so as to cover the engine 6, hydraulic pump 7, working oil tank 8, fuel tank 9 and exhaust gas after-treatment device 11. The top plate 14 is installed at a height position almost equal to the counterweight 10.

The top plate 14 is formed with an opening 14a (see FIG. 2) opening through the plate at a position corresponding to the engine 6. Maintenance of the engine 6 (particularly of the engine body 6a) is performed through the opening 14a.

The bonnet 16 is attached to an upper surface of the top plate 14 through a hinge (not shown) so as to permit opening or closing of the opening 14a. The bonnet 16 is formed in the shape of a vessel which swells upwards in its closed state, so that the inner space of the guard panel 12 is expanded upwards by a volume corresponding to the inner space of the bonnet 16.

Now, a description will be given below about a relation in height among the guard panel 12, engine 6 and hydraulic pump 7 with reference to FIG. 4. Height positions to be referred to below are the height positions from the base frame 4.

In this embodiment, the height H1 of the engine body 6a is almost equal to or a little higher than the height H2 of the top plate 14 and is lower than the height H3 of the bonnet 16. The height H4 of the hydraulic pump 7 is lower than each of the heights H1 to H3. Between the hydraulic pump 7 and the guard panel 12 is disposed the exhaust gas after-treatment device 11.

Figure 4:
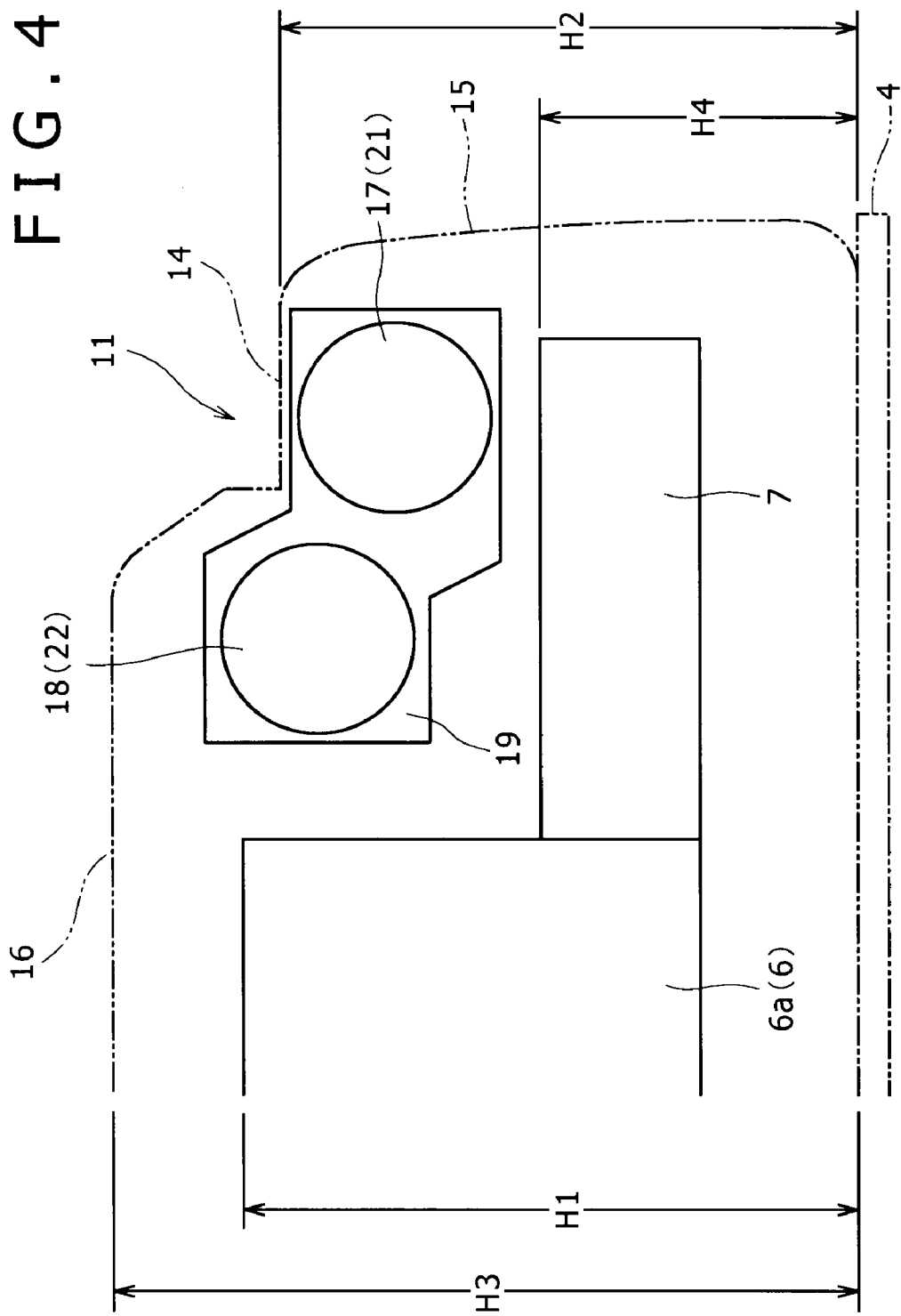
FIG. 4 is a rear view of the upper rotating body of FIG. 3.
Figure 5:
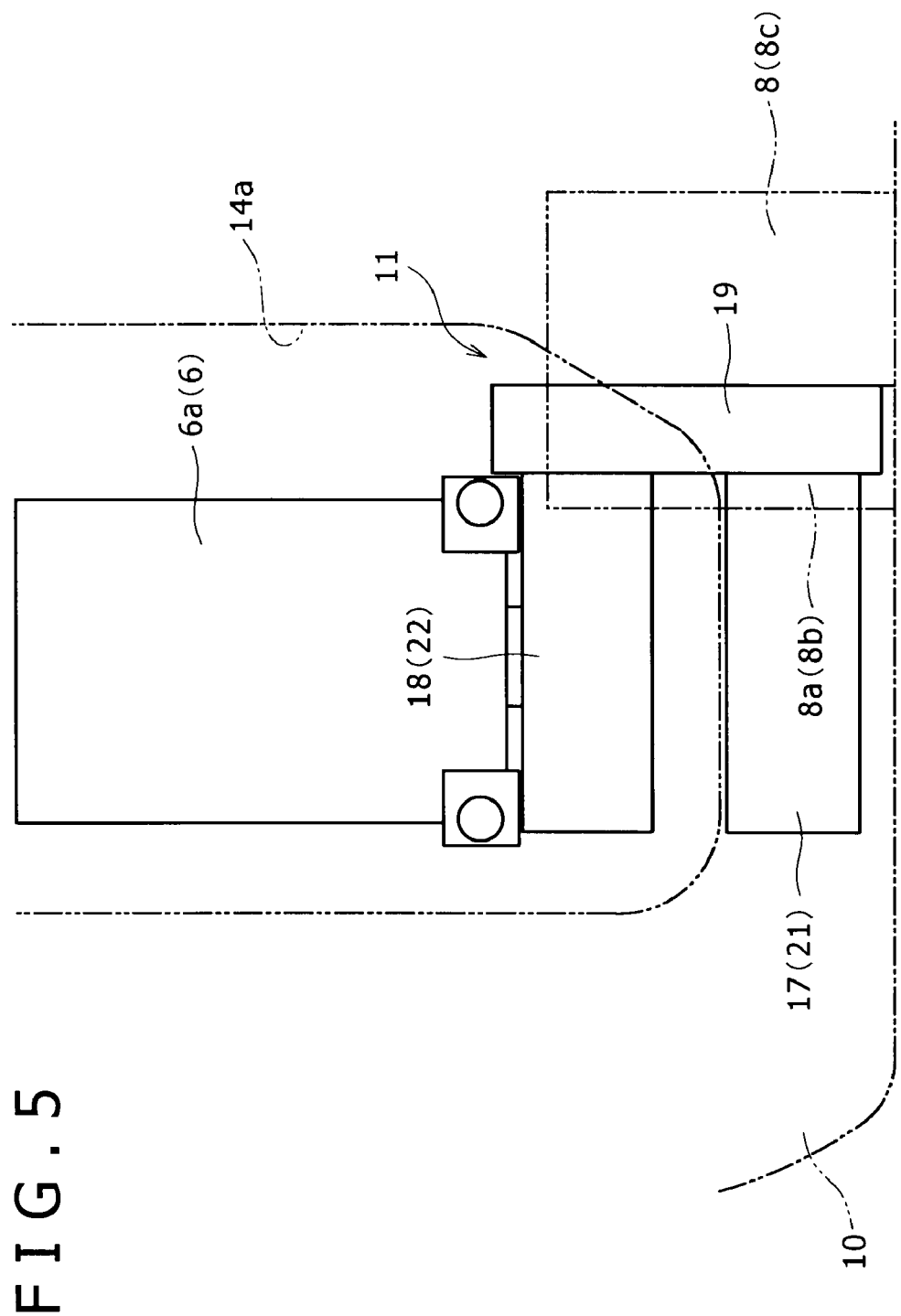
FIG. 5 is a plan view thereof.

FIG. 4 is a rear view of the upper rotating body of FIG. 3 and FIG. 5 is a plan view thereof.

Referring to FIGS. 3 to 5, the exhaust gas after-treatment device 11 is provided with a first treatment section (one treatment section) 17 connected to an exhaust passage of the engine 6, a connecting section 19 which receives exhaust gas discharged from the first treatment section 17, a second treatment section (the other treatment section) 18 which receives exhaust gas discharged from the connecting section 19, and an exhaust pipe 20 (see FIG. 1) for discharging the exhaust gas discharged from the second treatment section 18 to the exterior of the guard panel 12. The exhaust pipe 20 extends from the second treatment section 18 to the outside of the guard panel 12 through the guard panel 12 (bonnet 16).

The first treatment section 17 has a filter (Diesel Particulate Filter, hereinafter referred to as DPF, not shown) for removing soot and mist contained in the exhaust gas from the engine 6, and a first case 21 for housing the DPF therein. The DPF has the ability to collect soot, etc. contained in the exhaust gas flowing through the interior thereof, and the dust collecting ability can be regenerated by burning the collected dust at a high temperature.

The first case 21 is a cylindrical member extending in the longitudinal direction and having a circular section and it houses the DPF therein. As shown in FIG. 4, the first case 21 is disposed lower than the top plate 14 and higher than the hydraulic pump 7. As shown in FIGS. 4 and 5, the first case 21, as seen from above, is positioned outside the opening 14a of the top plate 14 and along a right edge of the opening 14a of the top plate 14.

The second treatment section 18 has a catalyst layer (not shown) for removing NOx contained in the exhaust gas from the engine 6, and a second case 22 which houses the catalyst layer therein. This catalyst layer allows the exhaust gas sprayed with aqueous urea to pass through the interior thereof, thereby inducing a so-called denitration reaction to decompose nitrogen oxides (NOx) contained in the exhaust gas into nitrogen, oxygen and water.

The second case 22 is a cylindrical member extending in the longitudinal direction and having a circular section and it contains the aforesaid catalyst layer. A sectional area of the second case 22 is set almost equal to the sectional area of the first case 21 and the second case 22 is disposed at a higher position than the first case 21. More specifically, in this embodiment, an upper surface of the second case 22 is disposed at a position higher than the top plate 14 and lower than the bonnet 16, and therefore an upper portion of the second case 22 is disposed higher than the top plate 14 through the opening 14a and lower than the bonnet 16. A vertex portion of the second case 22 is positioned higher than an upper surface of the engine body 6a.

As seen from above, as shown in FIG. 5, the second case 22 is disposed within the opening 14a of the top plate 14. More specifically, the second case 22, as seen from above, is disposed within the opening 14a along the first case 21, and along the right edge of the opening 14a so as to sandwich the right edge of the opening 14a between the second case 22 and the first case 21. Further, the second case 22 is disposed. Therefore, it is possible to effectively utilize the vertical space from the hydraulic pump 7 up to the guard panel 12 which space was expanded upwards by a volume corresponding to the bonnet 16.

Although in this embodiment a description is being given about the structure wherein the flowing direction of exhaust gas in the first case 21 and that in the second case 22 are longitudinally parallel, it is not always necessary that both flowing directions be parallel. For example, the first and second cases 21 and 22 may be disposed so that both flowing directions are orthogonal to the longitudinal direction.

The connecting portion 19 supports the front ends of the first and second cases 21 and 22 which are not level so that an upper surface of the first case 21 is positioned higher than that of the second case 22. The connecting portion 19 is mounted onto the upper surface 8a of the working oil tank 8. The dimension from a front end face of the connecting section 19 to a rear end face of each of the cases 21 and 22 is set to a longitudinal dimension which permits the connecting section and those cases to be fitted in between a front face of the counterweight 10 and a rear face of the large height portion 8c of the working oil tank 8.

According to the above embodiment, as described above, since an upper portion of the second treatment section 18 is disposed higher than the top plate 14 and lower than the bonnet 16, it is possible to effectively utilize the narrow space between the base frame 4 and guard panel 12.

That is, in the area inside the opening 14a, as compared with the other area, the height from the base frame 4 to the guard panel 12 becomes higher by the projecting length of the bonnet 16. And the upper portion of the second treatment section 18 is positioned higher than the top plate 14 through the opening 14a, and therefore the exhaust gas after-treatment device 11 can be disposed by effectively utilizing the vertical space within the existent bonnet 16 without forming a new projecting portion on the top plate 14.

And the exhaust gas after-treatment device 11 can be consequently disposed while avoiding an increase of height and hence avoiding narrowing of the operator's visual field.

As in the above embodiment, the first and second treatment sections 17 and 18 are disposed so that the exhaust gas flows in the longitudinal direction, the respective sectional shapes orthogonal to the flow direction are almost same circular section, and the first and second treatment sections 17 and 18 are installed at different height positions. Since the first treatment section 17 the second treatment section 18 of the almost same section are installed at different height positions, it is possible to reduce the cost required for fabricating the treatment sections 17 and 18 as compared with the case where the treatment sections 17 and 18 are each formed in special sectional shapes in order to form a portion of the second treatment section 18 positioned higher than the top plate 14.

As in the above embodiment, when the treatment section 18 installed at a higher position of the treatment sections 17 and 18 is disposed within the opening 14a as seen from above, the second treatment section 18 positioned higher can be positioned as high as possible within the range that it is housed in the bonnet 16, so that the space under the treatment section 18 can be effectively utilized accordingly.

As in the above embodiment, when the treatment sections 17 and 18 are disposed inside and outside of the opening 14a respectively so as to sandwich the right edge of the opening 14a therebetween as seen from above, and are disposed so that the right edge of the opening 14a sandwiched by the treatment sections 17 and 18 and the exhaust gas flowing direction in the treatment sections 17 and 18 run along each other, the upper portion of the second treatment section 18 is disposed inside the opening while disposing both treatment sections 17 and 18 as close as possible to each other, and therefore the vertical space in the guard panel 12 can be utilized effectively by utilizing the difference in height between the bonnet 16 and the top plate 14.

As in the above embodiment, according to the structure wherein the first and second treatment sections 17 and 18 are disposed so that the exhaust gas flowing directions are substantially parallel to each other, the whole of the exhaust gas after-treatment device 11 can be disposed in a more compact form between the guard panel 12 and the base frame 4.

Further, by forming the small height portion 8b in the working oil tank 8 as in the above embodiment, the space for disposing the exhaust gas after-treatment device 11 can be expanded in the horizontal direction and hence the exhaust gas flowing path can be made longer for each of the first and second treatment sections 17 and 18. Consequently, the exhaust gas purifying performance can be further improved.

Figure 6:
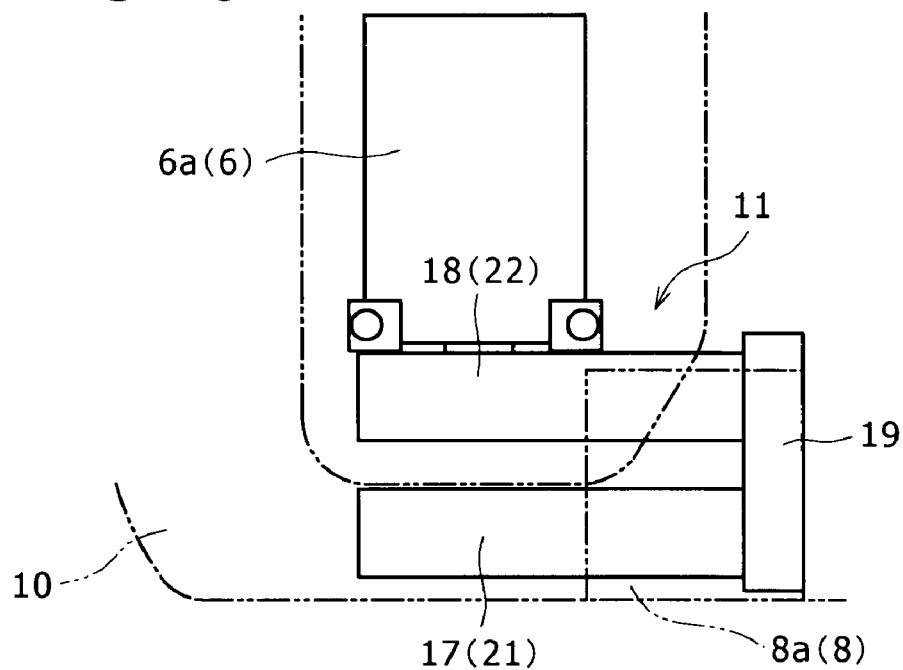
FIG. 6 is a diagram corresponding to FIG. 5, showing another embodiment of the present invention.

Although in the above embodiment only the rear portion of the working oil tank 8 is formed as the small height portion 8b and the exhaust gas after-treatment device 11 is disposed over the small height portion 8b, the whole of the working oil tank 8 may be formed as the small height portion 8b, as shown in FIG. 6.

As a result of the small height portion 8b over the entire upper surface of the working oil tank 8, the exhaust gas after-treatment device 11 can be made longer in the longitudinal direction and hence it is possible to further improve the exhaust gas purifying performance.

Figure 7:
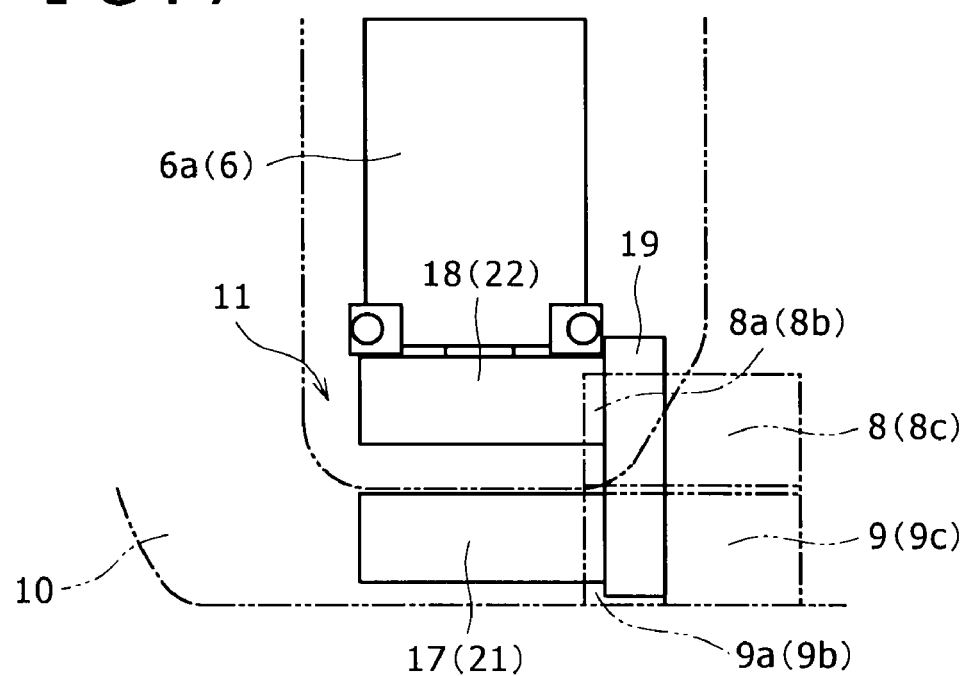
FIG. 7 is a diagram corresponding to FIG. 5, showing a further embodiment of the present invention.
Figure 8:
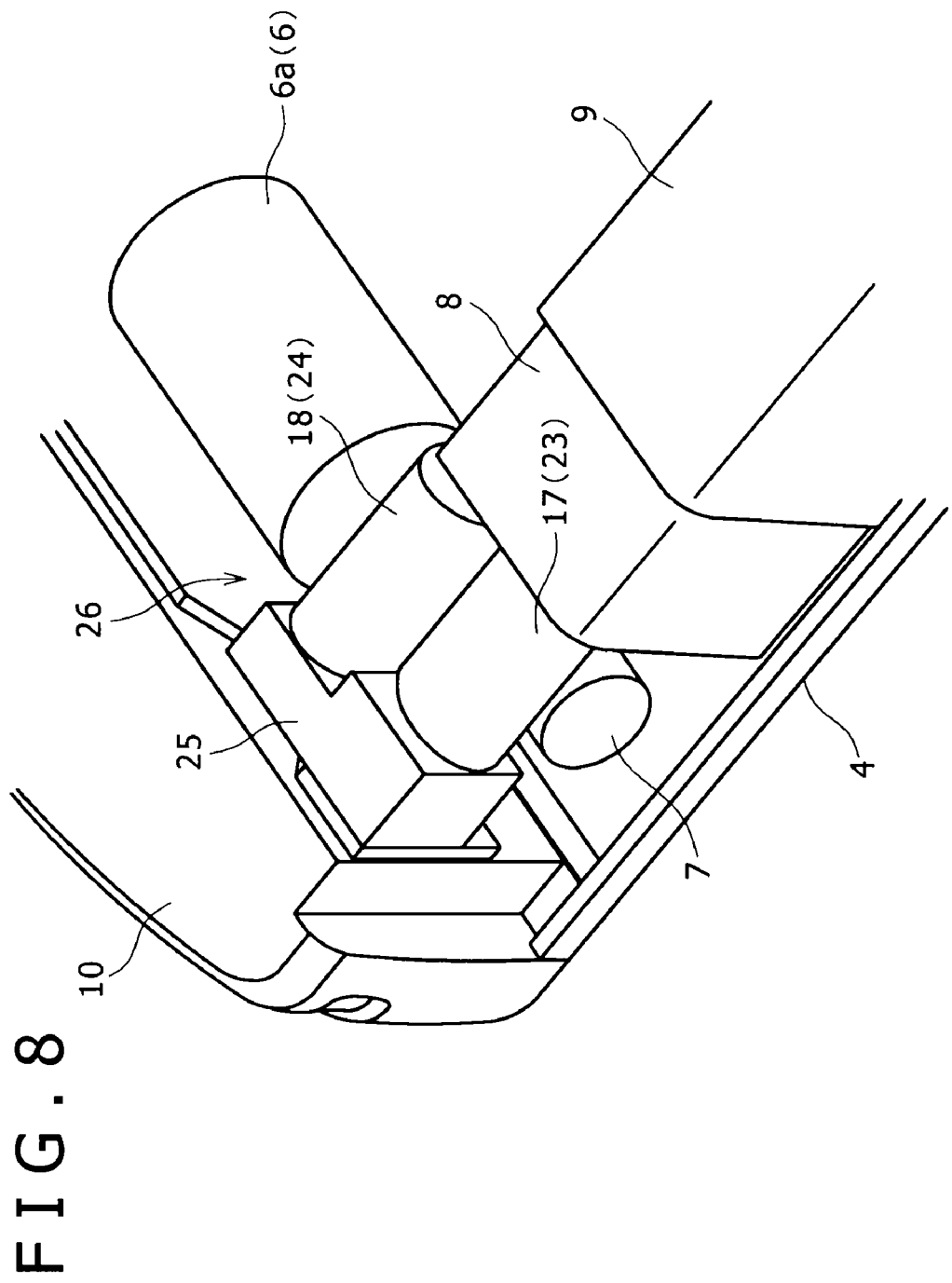
FIG. 8 is a partially enlarged perspective view of an upper rotating body according to a still further embodiment of the present invention.

The small height portion 8b is formed in only the working oil tank 8 in the above embodiment. Instead of the working oil tank 8, the small height portion 8b may be formed in at least one of the working oil tank 8 and the fuel tank 9 both disposed adjacent to the hydraulic pump 7. As shown in FIG. 7, in the case where the working oil tank 8 and the fuel tank 9 are juxtaposed right and left in front of the hydraulic pump 7, small height portions 8b and 9b and large height portions 8c and 9c may be formed in the tanks 8 and 9 respectively, and the exhaust gas after-treatment device 11 can be disposed on the small height portions 8b and 9b.

In the above embodiment, the position of an upper portion of the first case 21 and that of the second case 22 are made different from each other by adjusting the height positions of both cases each having a circular section. However, there also may be adopted a first case 23 and a second case 24 each having an elliptic section, as shown in FIGS. 8 to 11.

An exhaust gas after-treatment device 26 used in this embodiment mainly includes a first case 23 disposed between the top plate 14 and the hydraulic pump 7, a second case 24 disposed between the bonnet 16 and the hydraulic pump 7, and a connecting section 25 for connecting rear end portions of both cases 23 and 24 with each other.

Figure 9:
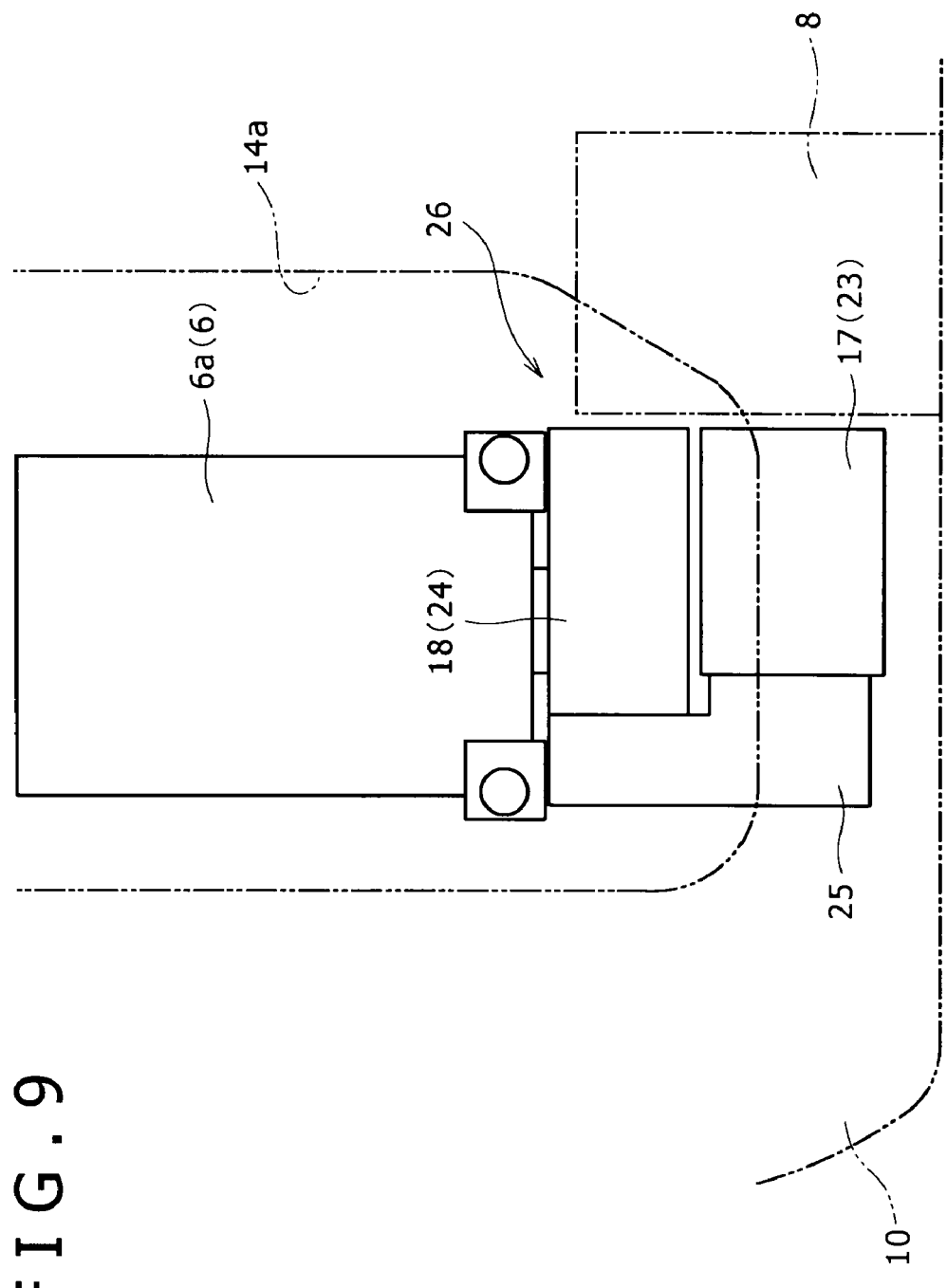
FIG. 9 is a plan view of an upper rotating body shown in FIG. 6.
Figure 10:
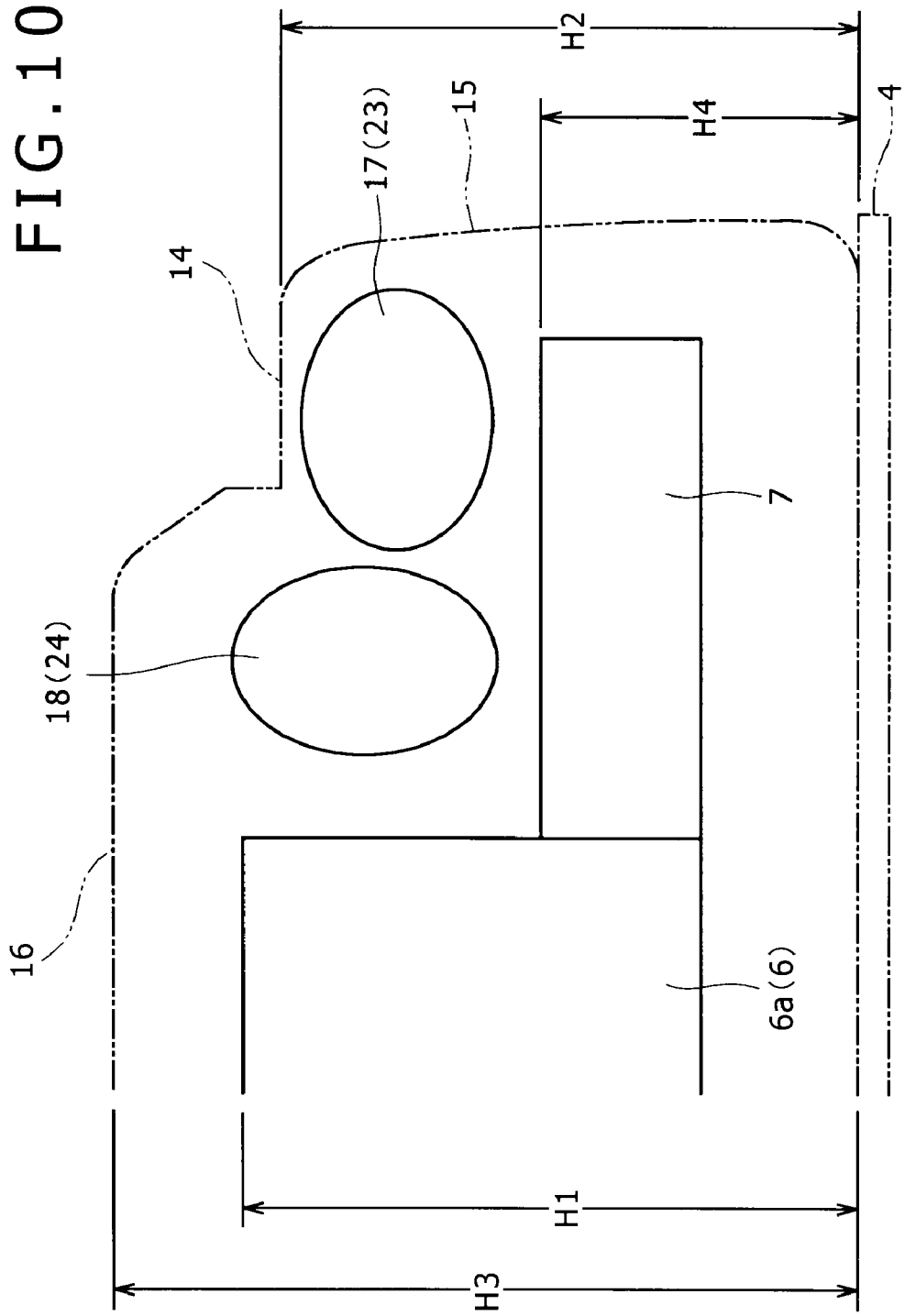
FIG. 10 is a rear view thereof.
Figure 11:
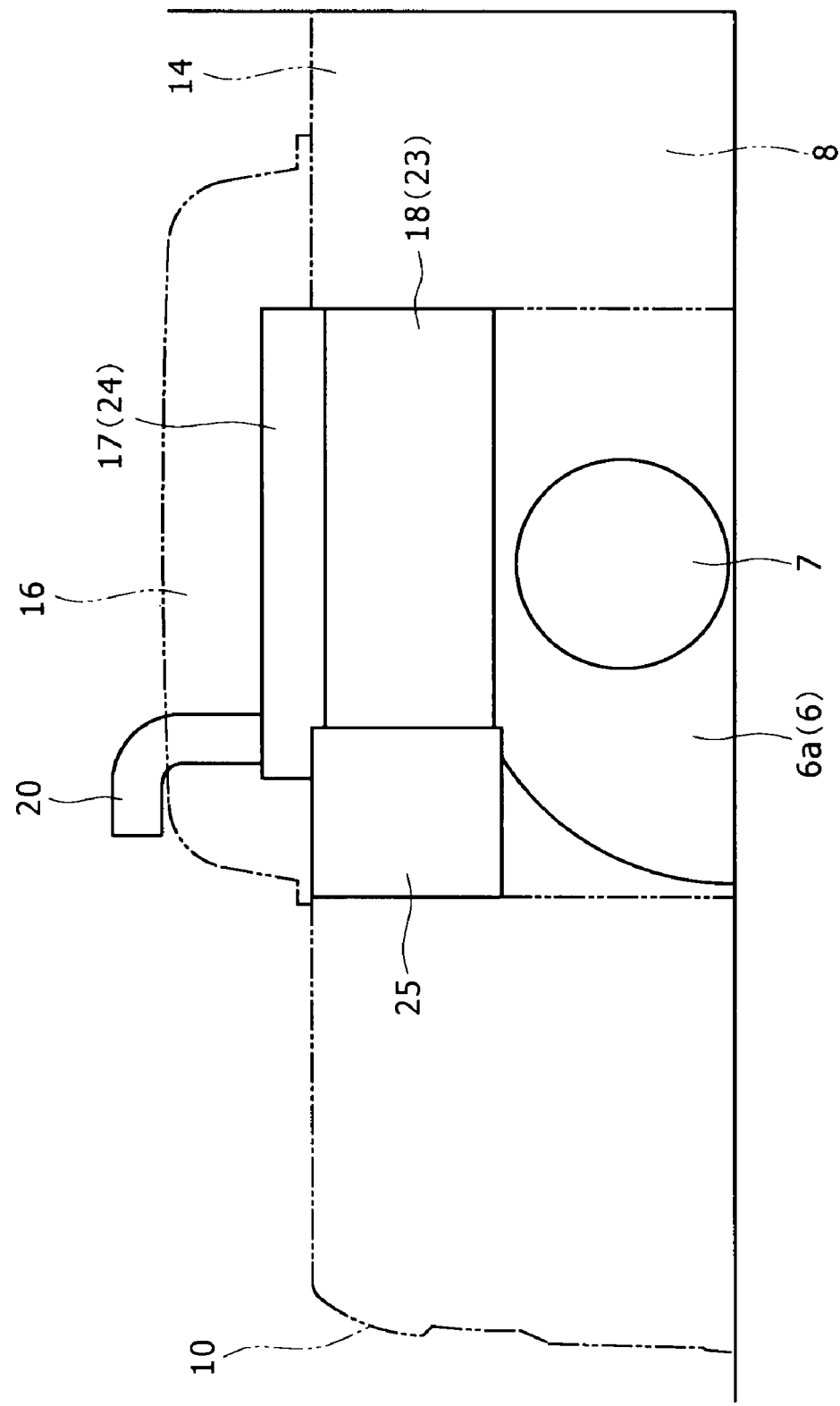
FIG. 11 is a side view thereof.

As shown in detail in FIG. 9, the most part of the first case 23 is disposed right outside the formation range of the opening 14a, and the remaining part thereof is positioned so as to overlap the formation range of the opening 14a. The first case 23 is disposed so that exhaust gas flows longitudinally, and its section orthogonal to the exhaust gas flowing direction is in an elliptic shape with the major axis thereof in the right and left direction.

On the other hand, the second case 24 is positioned inside the opening 14a, as seen from above, so that the whole thereof lies within the formation range of the opening 14a. The second case 24 is disposed so that exhaust gas flows longitudinally therein, and its section orthogonal to the exhaust gas flowing direction is in an elliptic shape with the major axis thereof in the vertical direction. Further, the second case 24 and the first case 23 are almost equal in sectional area and respective lower surfaces lie at almost equal heights.

Thus, in this embodiment, since the elliptic sectional shape is adopted for each of the cases 23 and 24, a large sectional area can be ensured for an exhaust gas flowing path as compared with the circular section as in the above embodiment, thus the flow path length can be fortunately shortened. In this embodiment, therefore, a sufficient flow rate of exhaust gas can be ensured even without forming the small height portion 8b (see FIG. 3) in the working oil tank 8. However the effect of this configuration is not to exclude the small height portion 8b.

According to the above embodiment, when the space under the first treatment section 17 and that under the second treatment section 18 are limited to almost equal height positions, a limited space between the base frame 4 and the guard panel 12 can be utilized effectively by adjusting the direction of the maximum length (major axis) in sectional shape in conformity with the expanse of the space between the guard panel 12 and the base frame 4. In the above embodiment, since the sectional shape of the second treatment section 18 is made vertically long, the area over the base frame 4 required for disposing the second treatment section 18 can be made small and hence the side space of the second treatment section 18 can be utilized effectively.

Inventions having the following structures are mainly included in the concrete embodiments described above.

The present invention provides a construction machine having a working attachment, the construction machine including: a base frame for supporting the working attachment so as to be raised and lowered; an engine installed on the base frame; an exhaust gas after-treatment device able to purify exhaust gas from the engine while the exhaust gas flows therethrough; and a guard panel installed over the base frame so as to cover the engine and the exhaust gas after-treatment device, wherein the exhaust gas after-treatment device includes a first treatment section having a filter able to collect dust contained in the exhaust gas from the engine and a second treatment section having a catalyst for decomposing nitrogen oxides contained in the exhaust gas treated by the first treatment section, the guard panel includes a top plate, the top plate being disposed substantially in parallel with the base frame and having an opening in a portion thereof corresponding to the engine, and a bonnet formed so as to project upwards from the top plate and cover the opening, one of the first and second treatment sections is disposed lower than the top plate, and at least a part of the other treatment section is disposed higher than the top plate through the opening and lower than the bonnet.

According to the present invention, since at least a part of the other treatment section is disposed higher than the top plate and lower than the bonnet, it is possible to effectively utilize the limited space between the base frame and the guard panel.

That is, in the inside of the opening as compared with the other area, the height from the base frame to the guard panel becomes higher by the projecting distance of the bonnet, but at least a part of the other treatment section is positioned higher than the top plate through the opening, and therefore, the exhaust gas after-treatment device can be disposed by effectively utilizing the vertical space within the existent bonnet even without forming a projecting portion on the top plate.

Thus, the exhaust gas after-treatment device can be disposed while avoiding an increase of height and hence avoiding narrowing of the operator's visual field.

In the above construction machine, preferably, the first and second treatment sections are disposed so that an exhaust gas flow passing through the interior of each of the treatment sections faces in the horizontal direction, have almost equal circular sectional shapes as sectional shapes orthogonal to the exhaust gas flowing direction, and are mounted at height positions different from each other.

That is, if one of the treatment sections which is disposed at a higher position is the other treatment section, and at least a part of this treatment section is positioned higher than the top plate, the first and second treatment sections of the same sectional shape have different height positions. And therefore, the cost required for fabricating each treatment section can be reduced as compared with the case where the first and second treatment sections are formed in a special sectional shape (e.g., ellipse) for forming a part positioned higher than the top plate on the other treatment section.

In case of disposing the first and second treatment sections at different positions, the treatment section disposed at a higher position out of both treatment sections can be disposed within the opening as seen from above.

By so doing, one of both treatment sections which is disposed at a higher position can be disposed as high as possible within the range that it is housed in the bonnet. And the space under the treatment section can be effectively utilized.

On the other hand, preferably, the first and second treatment sections are disposed so that an exhaust gas flow passing through the interior of each of the treatment sections faces in the horizontal direction and so that respective lower surfaces lie at almost equal height positions.

According to this structure, in the case where the spaces below the first and second treatment sections are limited at almost the same height positions, the limited space between the base frame and the guard panel can be utilized effectively by adjusting the direction of the maximum length in each sectional shape in conformity with the expanse of the space between the guard panel and the base frame.

More specifically, when one of the first and second treatment sections which one is larger in the maximum vertical dimension in its sectional shape orthogonal to the flowing direction is the other treatment section, the upper portion of the other treatment section can be positioned higher than the top plate through the opening and lower than the bonnet.

Further, a sectional shape of the one treatment section orthogonal to the exhaust gas flowing direction may be horizontally long, a sectional shape of the other treatment section orthogonal to the exhaust gas flowing direction may be vertically long, and the other treatment section may be disposed within the opening as seen from above.

By so doing, the entire upper portion of the other treatment section having a vertically long sectional shape, out of both treatment sections, can be disposed higher than the top plate through the opening and lower than bonnet. In this structure, since the sectional shape of the other treatment section is vertically long, the area over the base frame required for disposing the other treatment section (the area of the other treatment section as seen from above) can be made small and hence it becomes possible to effectively utilize the side space of the other treatment section accordingly.

In the above construction machine, preferably, the treatment sections are disposed inside and outside of the opening respectively so as to sandwich a part of an edge of the opening therebetween as seen from above and are disposed so that the part of the edge of the opening sandwiched by the treatment sections and the exhaust gas flowing direction in each of the treatment sections run along each other.

By so doing, the other treatment section can be positioned inside the opening as seen from above while disposing one and the other treatment sections at positions as close as possible so that the exhaust gas flowing directions in both treatment sections run along each other. Consequently, the vertical space in the guard panel can be utilized effectively by utilizing the difference in height between the bonnet and the top plate.

The first and second treatment sections can be disposed so that the exhaust gas flowing direction in the first treatment section and the exhaust gas flowing direction in the second treatment section are substantially parallel to each other.

By so doing, the whole of the exhaust gas after-treatment device can be disposed in a more compact form between the guard panel and the base plate by aligning the exhaust gas flowing directions in the first and second treatment sections.

Preferably, at least one of the treatment sections is disposed over a hydraulic pump connected to the engine.

By so doing, at least one of both treatment sections can be disposed by utilizing the space between the hydraulic pump and the guard panel. Particularly in case of disposing both treatment sections at different heights, by disposing the foregoing one treatment section below the other treatment section while disposing the other treatment section over the hydraulic pump and adjacently to the engine, the exhaust gas after-treatment device can be disposed by effectively utilizing the existing space between the hydraulic pump and the bonnet. On the other hand, in case of positioning the lower surfaces of both treatment sections at almost equal heights, both treatment sections can be disposed over the hydraulic pump.

Further, there may be adopted a structure wherein the construction machine further includes a tank device, the tank device being disposed adjacently to the hydraulic pump on the base frame and having at least one of a working oil tank and a fuel tank, the tank device having a small height portion at at least a part thereof on the hydraulic pump side, the small height portion having an upper surface located at a height position almost equal to or lower than an upper end of the hydraulic pump, and at least one of the treatment sections is disposed over the small height portion and the hydraulic pump.

By so doing, the installation space of each treatment section can be expanded in the horizontal direction by forming the small height portion, so that the exhaust gas flowing path length in each of the treatment sections can be made longer. Consequently, it is possible to further improve the exhaust gas purifying performance.

INDUSTRIAL APPLICABILITY

According to the present invention it is possible to dispose the exhaust gas after-treatment device while suppressing an increase of height and hence suppressing narrowing of the operator's visual field.

The invention claimed is:

1. A construction machine having a working attachment, said construction machine comprising:
    a base frame for supporting said working attachment so as to be raised and lowered;
    an engine installed on said base frame;
    an exhaust gas after-treatment device to purify exhaust gas from said engine while the exhaust gas flows therethrough; and
    a guard panel installed over said base frame so as to cover said engine and said exhaust gas after-treatment device, wherein said exhaust gas after-treatment device includes a first treatment section having a filter to collect dust contained in the exhaust gas from said engine and a second treatment section having a catalyst for decomposing nitrogen oxides contained in the exhaust gas treated by said first treatment section,
    said guard panel includes a top plate, said top plate being disposed in parallel with said base frame and having an opening in a portion thereof corresponding to said engine, and a bonnet formed so as to project upwards from said top plate and cover said opening,
    one of said first and second treatment sections is disposed lower than said top plate, and at least a part of the other treatment section is disposed higher than said top plate through said opening and lower than said bonnet.

2. The construction machine according to claim 1, wherein said first and second treatment sections are disposed so that an exhaust gas flow passing through the interior of each of said treatment sections faces in the horizontal direction, have equal circular sectional shapes as sectional shapes orthogonal to said exhaust gas flowing direction, and are mounted at height positions different from each other.

3. The construction machine according to claim 2, wherein one of said first and second treatment sections, which one is disposed at a higher position, is disposed within said opening as seen from above.

4. The construction machine according to claim 1, wherein said first and second treatment sections are disposed so that an exhaust gas flow passing through the interior of each of said treatment sections faces in the horizontal direction and so that respective lower surfaces lie at equal height positions.

5. The construction machine according to claim 4, wherein a sectional shape of said one of said first and second treatment sections orthogonal to the exhaust gas flowing direction is horizontally long, a sectional shape of the other treatment section orthogonal to the exhaust gas flowing direction is vertically long, and the other treatment section is disposed within said opening as seen from above.

6. The construction machine according to claim 1, wherein said treatment sections are disposed inside and outside of said opening respectively so as to sandwich a part of an edge of said opening therebetween as seen from above and are disposed so that the part of the edge of said opening sandwiched by said treatment sections and the exhaust gas flowing direction in each of said treatment sections run along each other.

7. The construction machine according to claim 1, wherein said first and second treatment sections are disposed so that the exhaust gas flowing direction in said first treatment section and the exhaust gas flowing direction in said second treatment section are parallel to each other.

8. The construction machine according to claim 1, wherein at least one of said treatment sections is disposed over a hydraulic pump connected to said engine.

9. The construction machine according to claim 8, further comprising a tank device, said tank device being disposed adjacently to said hydraulic pump on said base frame and having at least one of a working oil tank and a fuel tank,
    said tank device having a hydraulic pump side portion at at least a part thereof on a side of the hydraulic pump, said hydraulic pump side portion having an upper surface located at a height position equal to or lower than an upper end of said hydraulic pump, and
    at least one of said treatment sections is disposed over said hydraulic pump side portion and said hydraulic pump.

* * * * *